(12) United States Patent
Rhyu

(10) Patent No.: US 9,398,351 B2
(45) Date of Patent: Jul. 19, 2016

(54) METHOD AND APPARATUS FOR CONVERTING CONTENT IN MULTIMEDIA SYSTEM

(71) Applicant: Samsung Electronics Co., Ltd., Suwon-si, Gyeonggi-do (KR)

(72) Inventor: Sung-Ryeul Rhyu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 14/313,323

(22) Filed: Jun. 24, 2014

(65) Prior Publication Data

US 2014/0375879 A1    Dec. 25, 2014

(30) Foreign Application Priority Data

Jun. 24, 2013  (KR) .................. 10-2013-0072744

(51) Int. Cl.

| | |
|---|---|
| *H04N 21/854* | (2011.01) |
| *H04N 21/218* | (2011.01) |
| *H04N 21/2747* | (2011.01) |
| *H04N 21/41* | (2011.01) |
| *H04N 21/4402* | (2011.01) |

(52) U.S. Cl.
CPC ... *H04N 21/85406* (2013.01); *H04N 21/21815* (2013.01); *H04N 21/2747* (2013.01); *H04N 21/4104* (2013.01); *H04N 21/440218* (2013.01)

(58) Field of Classification Search
None
See application file for complete search history.

(56) References Cited

U.S. PATENT DOCUMENTS

| | | | |
|---|---|---|---|
| 8,078,644 B2 | 12/2011 | Hannuksela | |
| 2003/0018978 A1* | 1/2003 | Singal et al. | ............ 725/115 |
| 2004/0057457 A1 | 3/2004 | Ahn et al. | |
| 2008/0275905 A1 | 11/2008 | Hannuksela | |
| 2010/0135646 A1 | 6/2010 | Bang et al. | |
| 2010/0198798 A1 | 8/2010 | Doehla et al. | |
| 2011/0064146 A1 | 3/2011 | Chen et al. | |
| 2012/0023250 A1* | 1/2012 | Chen et al. | ............ 709/231 |
| 2012/0269256 A1 | 10/2012 | Ki et al. | |
| 2013/0185450 A1* | 7/2013 | Rosenfeld et al. | ........ 709/231 |
| 2014/0019587 A1* | 1/2014 | Giladi | .................. 709/217 |

FOREIGN PATENT DOCUMENTS

| | | |
|---|---|---|
| JP | 2010-526468 A | 7/2010 |
| KR | 10-2011-0073174 A | 6/2011 |

* cited by examiner

*Primary Examiner* — Michael Teitelbaum
(74) *Attorney, Agent, or Firm* — Jefferson IP Law, LLP

(57) ABSTRACT

A method and an apparatus for converting content by a terminal in a multimedia system are provided. The method includes acquiring reference information for converting a first content based on a Moving Picture Experts Group (MPEG) transport stream to a second content based on a media file format and converting the first content to the second content using the reference information.

8 Claims, 8 Drawing Sheets

METHOD AND APPARATUS FOR CONVERTING CONTENT IN MULTIMEDIA SYSTEM

CROSS-REFERENCE TO RELATED APPLICATION(S)

This application claims the benefit under 35 U.S.C. §119 (a) of a Korean patent application filed on Jun. 24, 2013 in the Korean Intellectual Property Office and assigned Serial number 10-2013-0072744, the entire disclosure of which is hereby incorporated by reference.

TECHNICAL FIELD

The present disclosure relates to a method and an apparatus for converting content in a multimedia system. More particularly, the present disclosure relates to a method and an apparatus for converting content based on a transport stream to content of another format.

BACKGROUND

Moving Picture Experts Group (MPEG)-2 (ISO/IEC13818) Transport Streams (TSs) have been widely used in content transmission systems, such as broadcasting, Digital Versatile Discs (DVDs) and Blu-ray Discs (BDs). Videos and audios, which are constituent elements of MPEG-2 TS multimedia content, are stored in an MPEG-2 TS as an element stream encoded by an encoder to be output. In addition, the element stream is divided in units of packets to be capsulized by the MPEG-2 TS, and is multiplexed and stored in consideration of the size of the output buffer of an encoder and the size of an input buffer of a decoder.

Currently, studies for digital recording using ISOBMFF (ISO/IEC14496-12) (hereinafter, an International Standards Organization (ISO) base media file format) have been actively used to record some or all of broadcasts, DVDs, or Blu-ray content.

Accordingly, for example, a technology of converting a structure of a format of content is desired to digitally record some or all of content based on an MPEG-2 TS as content of an ISO base media file format.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for efficiently converting content based on a Moving Picture Experts Group (MPEG) transport stream to content based on a media file format in a multimedia system.

The present disclosure also provides a method and an apparatus for converting content based on an MPEG transport stream to content based on a media file format in a multimedia system, and allowing a plurality of terminals to share content.

In accordance with an aspect of the present disclosure, a method of converting content by a terminal in a multimedia system is provided. The method includes acquiring reference information for converting a first content based on an MPEG transport stream to a second content based on a media file format, and converting the first content to the second content using the reference information.

In accordance with another aspect of the present disclosure, a terminal for converting content in a multimedia system is provided. The terminal includes a transceiver configured to transmit and receive data through a communication network, a storage configured to store at least one content, a decoder configured to decode content which is to be reproduced, and a controller configured to acquire reference information for converting a first content based on an MPEG transport stream to a second content based on a media file format, and to control an operation of converting the first content to the second content using the reference information.

In accordance with another aspect of the present disclosure, a multimedia system in which a plurality of terminals share content is provided. The multimedia system includes a first terminal configured to acquire reference information for converting a first content based on an MPEG transport stream to a second content based on a media file format, to convert the a first content to the second content using the reference information, and to upload the second content to a cloud server, a second terminal configured to download the second content from the cloud server and to reproduce the second content, and a cloud server configured to store the second content according to a request of the first terminal, and to transmit the stored second content to the second terminal according to a request of the second terminal.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
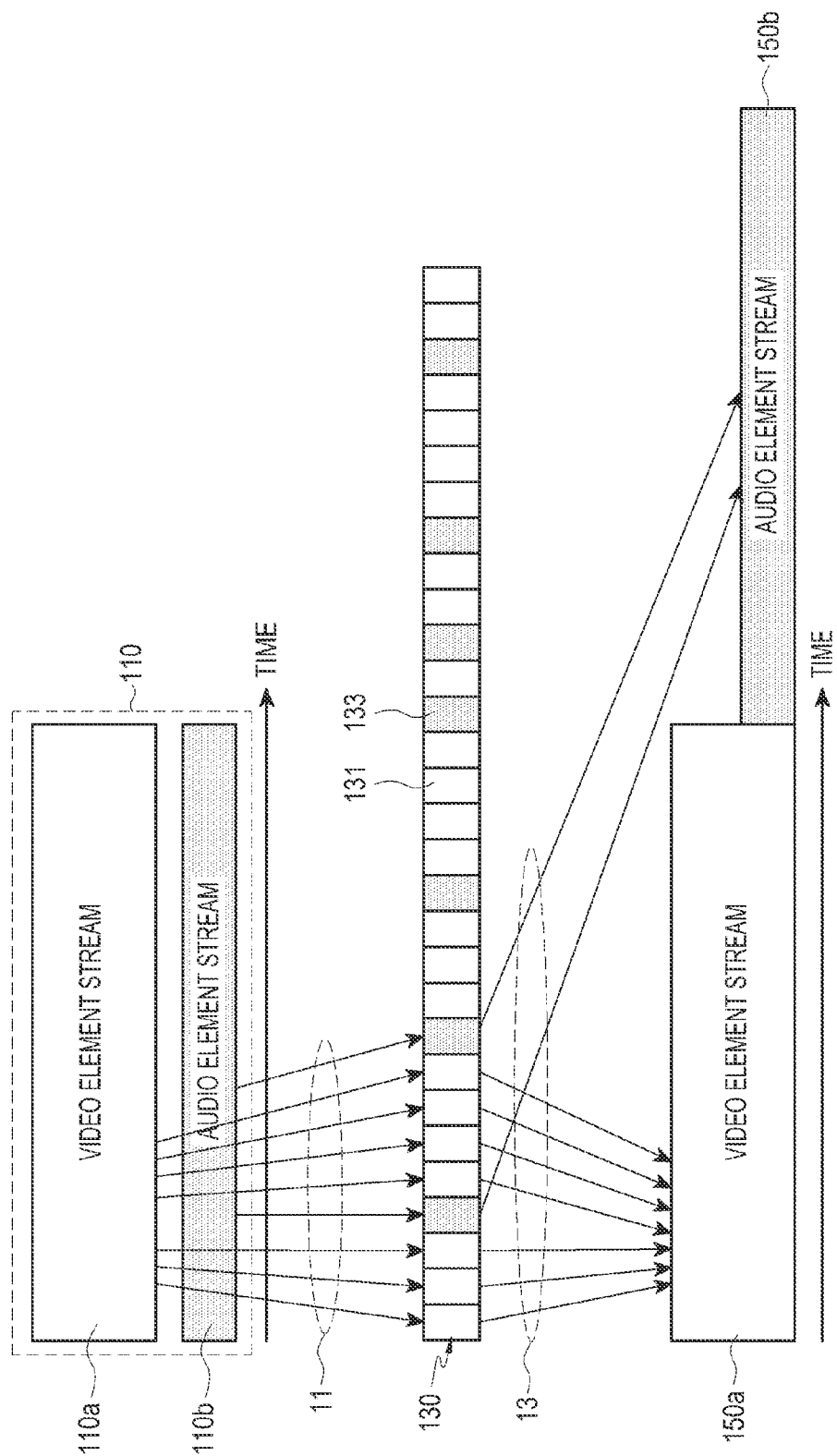
FIG. 1 is a view for explaining a method of converting a structure of Moving Picture Experts Group-2 Transport Streams (MPEG-2 TS) content to a structure of International Organization for Standardization (ISO) basic media file format content according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The multiplexing function provided by the Moving Picture Experts Group-2 Transport Streams (MPEG-2 TS) technology is not provided in the International Organization for Standardization (ISO) base media file format structure. Accordingly, in order to convert a structure of MPEG-2 TS content to a structure of ISO base media file format content, for example, a method compatible with an interleaving method which is processed in units of samples, chunks, runs and the like in a structure of ISO base media file format content is desired. Tracks, random access information and the like, which are not provided by the MPEG-2 TS structure, are requested to generated or their values are requested to be suggested when they are stored in an ISO base media file format structure. Accordingly, in an embodiment of the present disclosure, a method of providing necessary information when MPEG-2 TS content is stored as content of the ISO base media file format structure is also provided due to a structure difference between MPEG-2 TS and the ISO base media file format.

In the embodiment of the present disclosure, when some or all of the content of an MPEG-2 TS structure are converted to content of the ISO base media file format, information necessary for conversion to the ISO base media file format structure is inserted into the MPEG-2 TS content at a predetermined interval. The MPEG-2 TS content is converted to the ISO base media file format content by using the inserted information.

Although MPEG-2 TS content is exemplified in the embodiment of the present disclosure for convenience' sake, the embodiment of the present disclosure may be applied to convert various content having a Transport Stream (TS) structure to content of an ISO base media file format.

FIG. 1 is a view for explaining a method of converting a structure of MPEG-2 TS content to a structure of ISO base media file format content according to an embodiment of the present disclosure.

Referring to FIG. 1, a transport stream 110 of MPEG-2 TS content includes a video element stream 110*a* and an audio element stream 110*b*, and the transport stream 110 is packetized in operation 11. A plurality of packets generated by the element streams 110*a* and 110*b* constitute a packetized stream 130, and are mixed at a suitable ratio and are stored in consideration of sizes of an encoder buffer and a decoder buffer. In the example of FIG. 1, reference numeral 131 denotes a packet generated by the video element stream 110*a* and reference numeral 133 denotes a packet generated by the audio element stream 110*b*.

The packetized stream 130 is depacketized in operation 13 such that the stream 130 packetized, for example, according to a program ID is divided into a video element stream 150*a* and an audio element stream 150*b*. If element streams are acquired for the constituent elements of video and audio in a way, the element streams may become input streams, which are to be stored as an ISO base media file format structure. However, if the video and audio element streams 150*a* and 150*b* are extracted in the method of FIG. 1, multiplexing information between the video and audio element streams 150*a* and 150*b* may be lost.

Accordingly, as another embodiment for preventing loss of multiplexing information, a method of converting multiplexing information of an MPEG-2 TS to interleaving information of an ISO base media file format in consideration of the sizes of decoder buffers for element streams is suggested.

Figure 2:
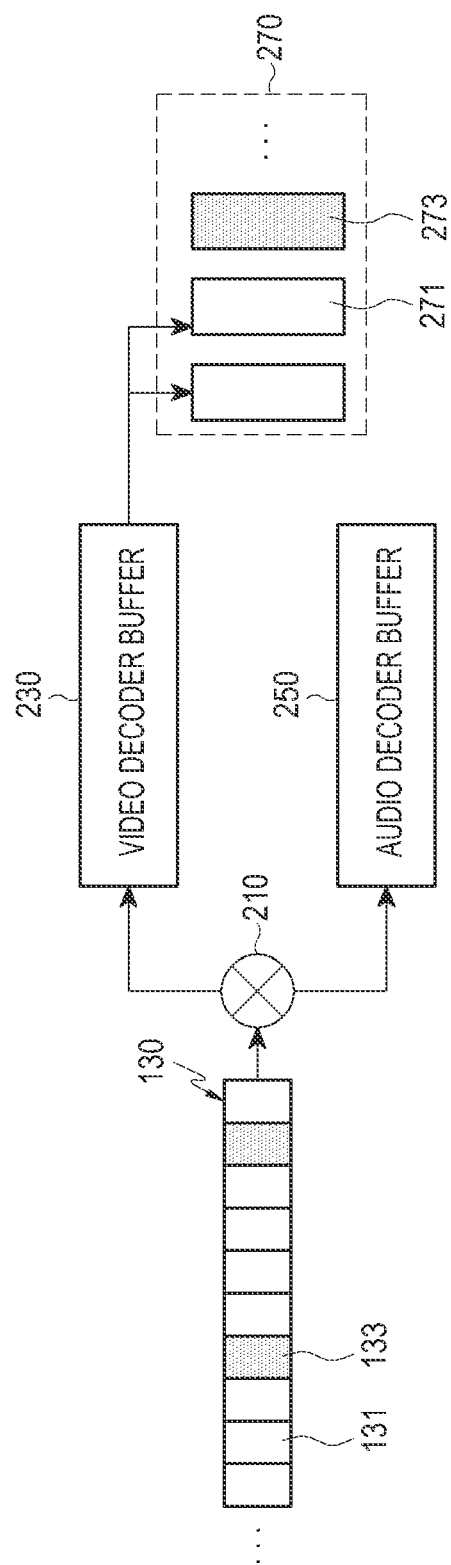
FIG. 2 is a view for explaining a method of converting a structure of MPEG-2 TS content to a structure of ISO basic media file format content according to another embodiment of the present disclosure.

FIG. 2 is a view for explaining a method of converting a structure of MPEG-2 TS content to a structure of ISO base media file format content according to an embodiment of the present disclosure. The same reference numerals will be given to the same elements as those of FIG. 1.

Referring to FIG. 2, decoder buffers 230 and 250 for element streams (i.e., video and audio element streams) are configured, a packetized stream 130 of an MPEG-TS is classified for constituent elements through a demultiplexer 210, and data of the element streams are stored in units (e.g., Access Units (AUs) of an MPEG-2 TS treated in an ISO base media file format) of samples if the sizes of the decoder buffers 230 and 250 exceeds a predetermined level or data of the element streams are stored in units of chunks (sets of samples in an Moov-mdat structure) or in units of runs (sets of samples in a movie fragment structure).

The samples/chunks/runs generated from different constituent elements are interleaved in respective units (samples/chunks/runs) as indicated by reference numeral 270 of FIG. 2. For example, one or a plurality of video samples 271 and one or a plurality of audio samples 273 may be sequentially mixed according to the sizes of the decoder buffers 230 and 250 and be stored. As another example, one video chunk and audio samples may be sequentially mixed and be stored.

Figure 3:
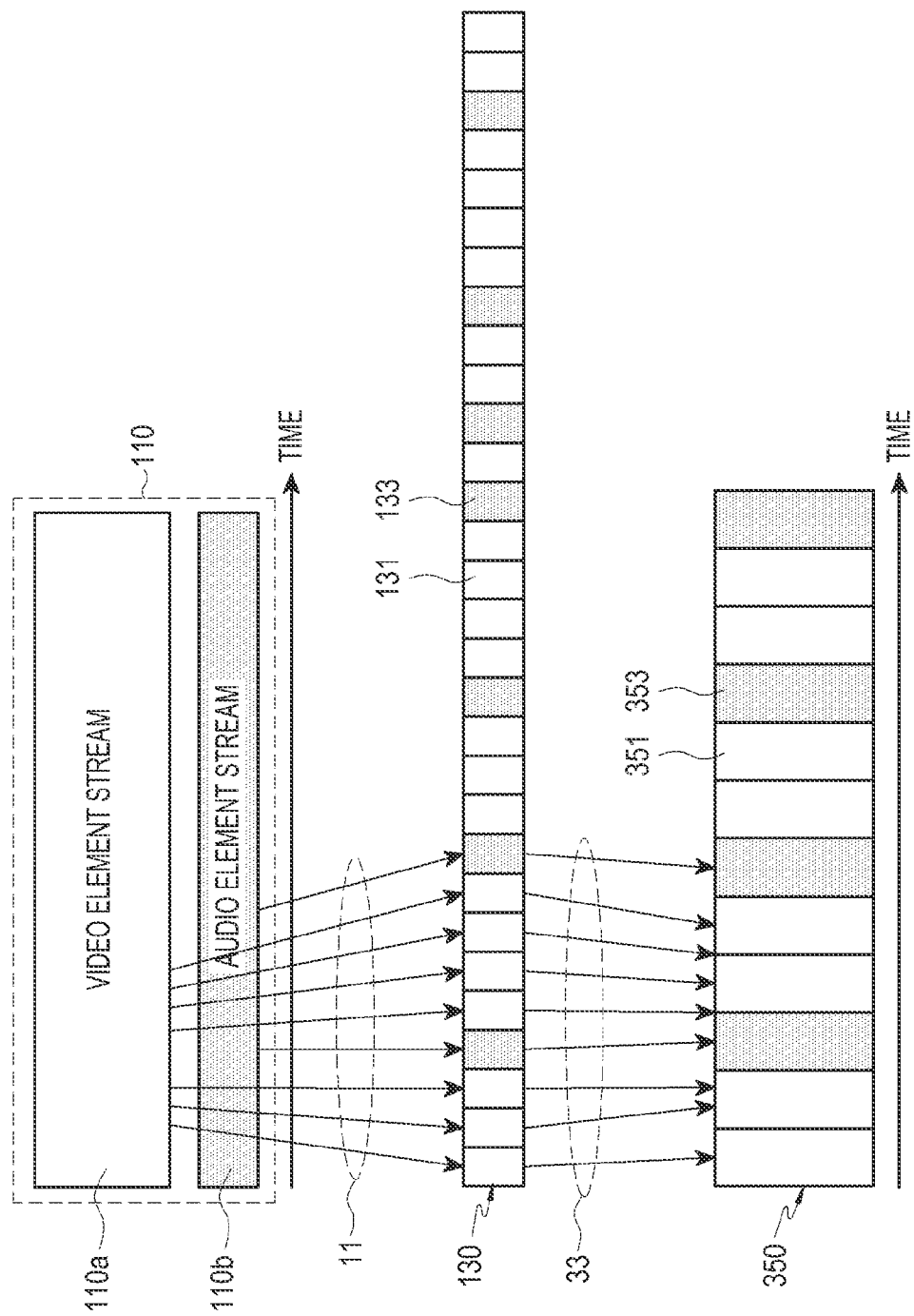
FIG. 3 illustrates an example of depacketizing a packetized stream of an MPEG-TS in units of samples according to an embodiment of the present disclosure.

FIG. 3 illustrates an example of depacketizing a packetized stream of a MPEG-TS in units of samples according to an embodiment of the present disclosure. The plurality of depacketized samples 350 are classified, for example, into video samples 351 and audio samples 353.

Referring to FIG. 3, a method of analyzing an MPEG-2 TS and converting a structure of content to an ISO base media file format file without using separate information is illustrated. However, in the embodiment of FIG. 3, because interleaving is performed when the structure of content is converted, interleaving information may be changed according to an implementation method for a manufacturer of a reproduction device (or a display device) for conversion of the structure. Accordingly, when different manufacturers provide different interleaving information of content, there may exist a problem of compatibility of content.

In order to solve the problem, when content of an MPEG-2 TS structure are generated, a problem of compatibility of content may be solved by providing separate information for conversion to an ISO base media file format structure in consideration of the conversion.

Figure 4:
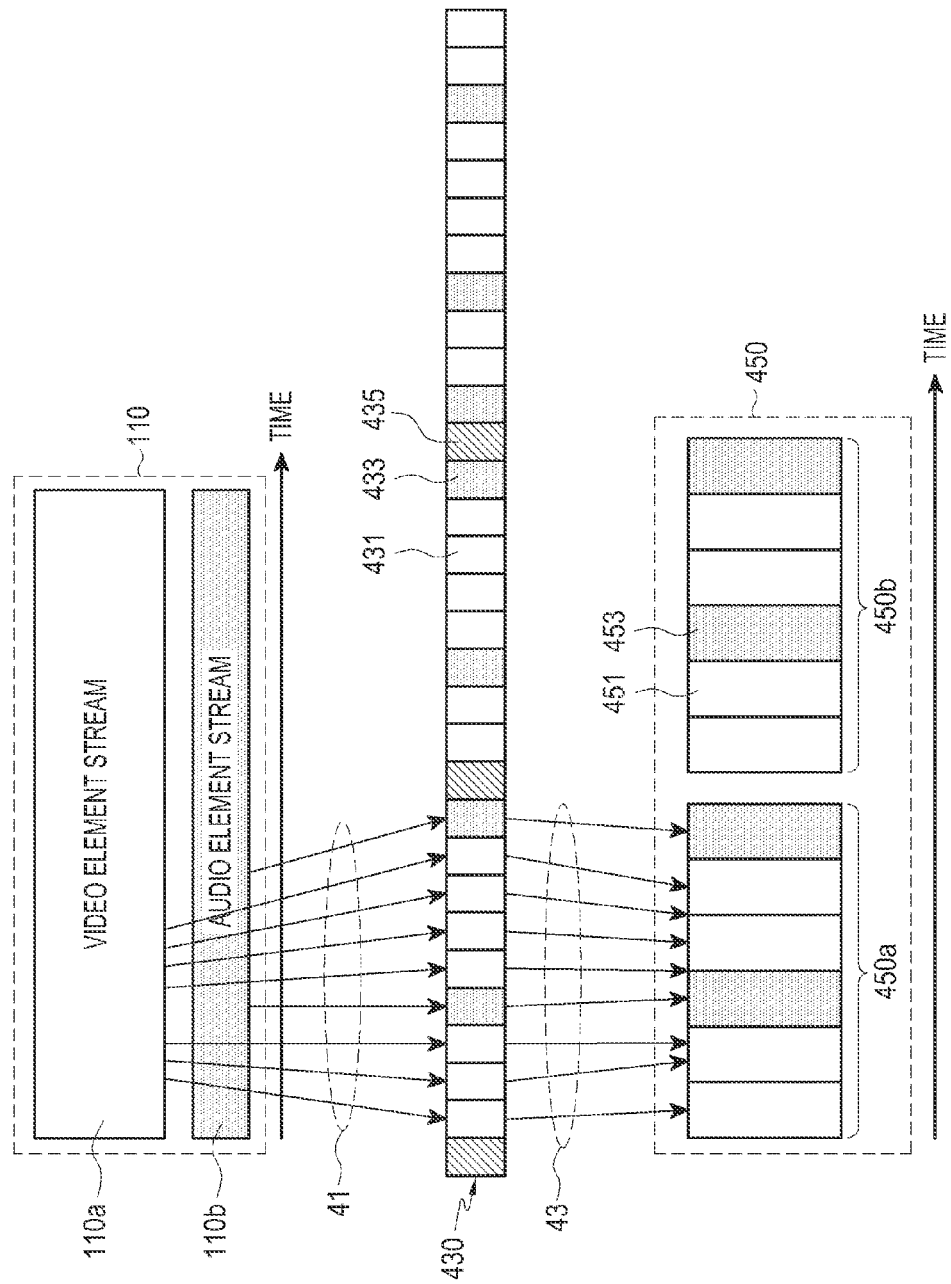
FIG. 4 is a view for explaining a method of converting a structure of MPEG-2 TS content to a structure of ISO basic media file format content according to an embodiment of the present disclosure.

FIG. 4 is a view for explaining a method of converting a structure of MPEG-2 TS content to a structure of ISO base media file format content according to an embodiment of the present disclosure. In FIG. 4, the same reference numerals will be given to the same elements as those of FIG. 1.

Referring to FIG. 4, a method of inserting information for distinguishing a movie fragment of an ISO base media file format for a predetermined or arbitrary packet interval of element streams of the MPEG-2 TS to convert the structure of content is illustrated. In the example of FIG. 4, a transport stream 110 including video and audio element streams 110a and 110b is packetized in operation 41, and a plurality of packets generated from the element streams 110a and 110b configure a packetized stream 430. A fragment indicator may be inserted into the packetized stream 430 as information for distinguishing a movie fragment for a predetermined or arbitrary packet interval. As an example, the fragment indicator may include header information of a packet corresponding to a distinguished location of the movie fragment. As another example, the fragment indicator may be provided as separate information distinguished from the packetized stream 430.

Referring to FIG. 4, reference numeral 431 denotes a packet generated from a video element stream, reference numeral 433 denotes a packet generated from an audio element stream 110b, and reference numeral 435 denotes the fragment indicator, and is classified by a movie fragment of an ISO base media file format for each fragment indicator.

Referring to FIG. 4, the packetized stream 430 is depacketized in operation 43, and is classified into movie fragments 450 in operations 450a and 450b in which video samples 451 and audio samples 453 are mixed by the fragment indicator 435. The fragment indicator 435 may be specifically defined by one or a plurality of pieces of parameter information.

For example, according to the present disclosure, the fragment indicator may be specifically defined by parameter information such as a time offset representing a time distance to the following fragment indicator, a byte offset representing a physical distance to the following fragment indicator, a track IDentifier (track ID) of a component element stream, the number of samples, a duration of samples, and a fragment decoding time. According to the parameter information, video samples/chunks/runs and audio samples/chunks/runs may be mixed through an interleaving structure implemented by a manufacture of a reproduction device (that is, a terminal). Table 1 represents an example of a fragment indicator analyzer algorithm implemented by the parameter information.

TABLE 1

```
Fragment_indicator_descriptor( ) {
    Time_offset;
    Byte_offset;
    Int Number_of_program;
    For(int i=0;i<number_of_program;i++) {
        Program_ID;
        Number_of_samples;
        Default_Sample_duration;
        If(default_sample_duration == 0) {
            For (j=0;j<number_of_samples;j++) {
                Sample_duration;
            }
        }
    }
}
```

Figure 5:
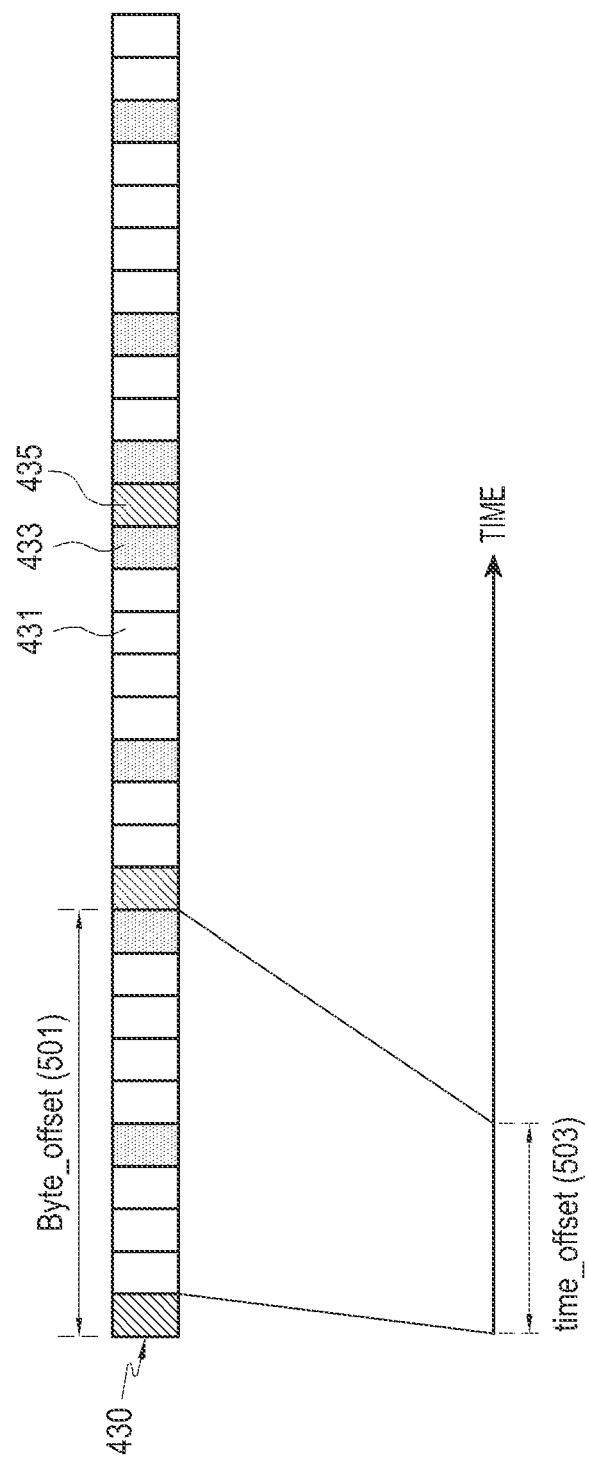
FIG. 5 is a view for explaining parameter information related to a fragment indicator according to an embodiment of the present disclosure.

FIG. 5 is a view for explaining parameter information related to a fragment indicator 4 according to an embodiment of the present disclosure. In particular, a time offset and a bite offset representing a time distance and a physical distance from one fragment indicator and the following fragment indicator in the parameter information exemplified in Table 1 will be described. In FIG. 5, the same reference numerals will be given to the same elements as those of FIG. 4.

Referring to FIG. 5, the bite offset 501 represents a bite size from the start of the current fragment indicator to the following fragment indicator. The time offset 503 represents a length of a time section in which the current fragment indicator provides information. The reproduction device (i.e., the terminal) may recognize a duration in which content is stored when the current fragment indicator is used by using the time offset 503 and determine whether recording is to be continuously performed based on the duration. (e.g., the user instructs 10 minute recording of content through the reproduction device, recording is currently performed for about 9 minutes and 30 seconds, and when the fragment indicator represents a duration in which the content is stored represents 5 minutes, the reproduction device may record a sample corresponding to about 30 seconds and the stop recording without waiting for the following fragment indicator.

In the embodiment of the present disclosure, the reproduction device may predict the size of an element stream section indicated by the fragment indicator using the byte offset 501, and when the left space of the storage medium is smaller than the byte offset 501, recording of the corresponding movie fragment is stopped and mfra (a known ISOBMFF standard may be referred to), which is information for configuration with a valid ISO base media file format file, is stored.

The number of programs in the parameter information refers to the number of element streams existing in a section indicated by the current fragment indicator. A program ID is indicated by the number of element streams, and the indicated program identifier has an "I" value of a "for loop" as track identifiers of a track box (trak box) and a track fragment header box (tfhd box) of an ISO base media file format in the fragment indicator analyzer algorithm. Here, the boxes may be understood as the concept of a filed in the file structure.

The number of samples refers to the number of element streams existing in a section indicated by the current fragment indicator. A default sample duration refers to a total length of all samples existing for tracks, and when the lengths of all the samples are not the same, a value of the default duration is set to 0, and when a value of the default sample duration is 0, the lengths for the samples may be represented by sample duration using a separate "for loop".

The default sample duration and the sample duration are used as a default sample duration of a track fragment header (tfhd box) of the ISO base media file format and a sample duration value of a track fragment run box (trun box).

In the specification, the fragment indicator, and one or a plurality of pieces of information defining the fragment indicator will be generally referred to as reference information for conversion of content.

The method of converting MPEG transport stream based content to media file format based content according to the embodiments of the present disclosure described in FIGS. 1 to 5 may be implemented in a reproduction device (or display device) for multimedia content with a terminal used by the user.

Figure 6:
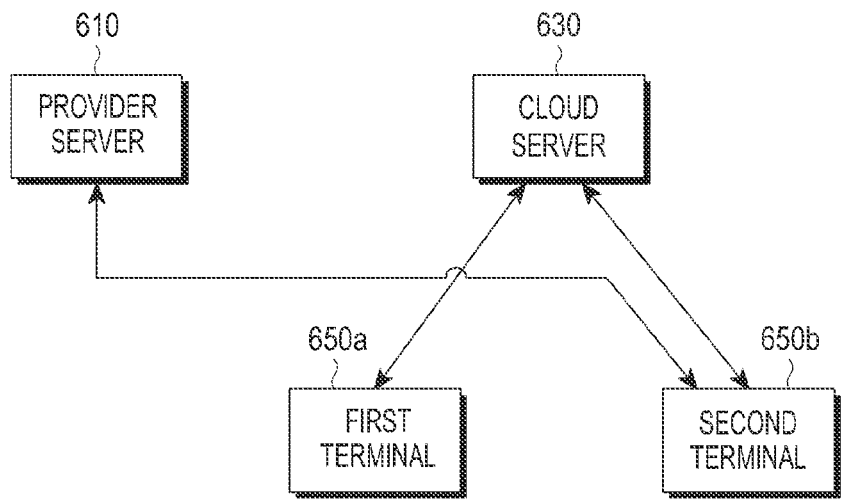
FIG. 6 is a view illustrating an example of a configuration of a multimedia system for sharing content by a plurality of terminals, and converting and reproducing a format of shared content using content conversion method by terminals according to an embodiment of the present disclosure.

FIG. 6 is a view illustrating a configuration of a multimedia system for sharing content by a plurality of terminals, and converting and reproducing a format of shared content using a content conversion method by terminals according to an embodiment of the present disclosure.

Referring to FIG. 6, a multimedia system includes a provider server 610, a cloud server 630, and a plurality of terminals 650a and 650b. It is assumed for convenience' sake that the plurality of terminals correspond to a first terminal 650a used by a first user and a second terminal 650b used by a second user, but the plurality of terminals is not limited thereto. The MPEG transport stream based content will be referred to as a first content, and the ISO base media file format based content will be referred to as a second content.

In a situation in which a user of the first terminal 650a uploads content owned by himself or herself to the cloud server 630 and a user of the second terminal 650b downloads the uploaded content from the cloud server 630 to use the content. The ISO base media file format based content may have a high resolution or a high image quality as compared with the MPEG transport stream based content. For example, while the MPEG transport stream based content may correspond to a High Definition (HD) level video, the ISO base media file format based content may correspond to an Ultra-High Definition (UHD) level video.

Accordingly, in the embodiment of the present disclosure, using the content conversion method, the user of the first terminal 650a may convert the first content of a low quality owned by himself or herself to the second content of a high quality and upload the second content to the cloud server 630. Then, the user of the second terminal 650b may download the second content from the cloud server 630 and reproduce the second content (hereinafter, Scenario 1). As another example, the user of the first terminal 650a may upload the first content of a low quality owned by himself or herself to the cloud server 630. Then, the user of the second terminal 650b may download the first content from the cloud server 630, and may convert the first content of a low quality to the second content of a high quality using the content conversion method and reproduce the second content (hereinafter, Scenario 2). According to Scenario 1 or Scenario 2, the first terminal 650a or the second terminal 650b includes a client program for performing the content conversion method. The client program may be mounted to the first terminal 650a or the second terminal 650b in advance or may be provided to the first terminal 650a or the second terminal 650b through the provider server 610 (or the cloud server 630).

The provider server 610 may provide license information for an authorized use of the content to the second terminal 650b to allow sharing of the content. The license information may include an encryption key for reproduction of the second content. In this way, when the license information is provided, the client program generates an encrypted second content when the first content is converted to the second content. The encrypted second content may be decrypted through the encryption key. The provider server 610 may be a server of a provider which provides content (e.g., a Content Provider (CP)) or a server of a provider which provides a content related service (e.g., a Service Provider (SP)). The cloud server 630 is a server of a provider which provides an upload and/or download service for various content through a cloud network to a plurality of subscribed terminals. The provider server 610 and the cloud server 630 may be realized by one or a plurality of servers, respectively.

Figure 7:
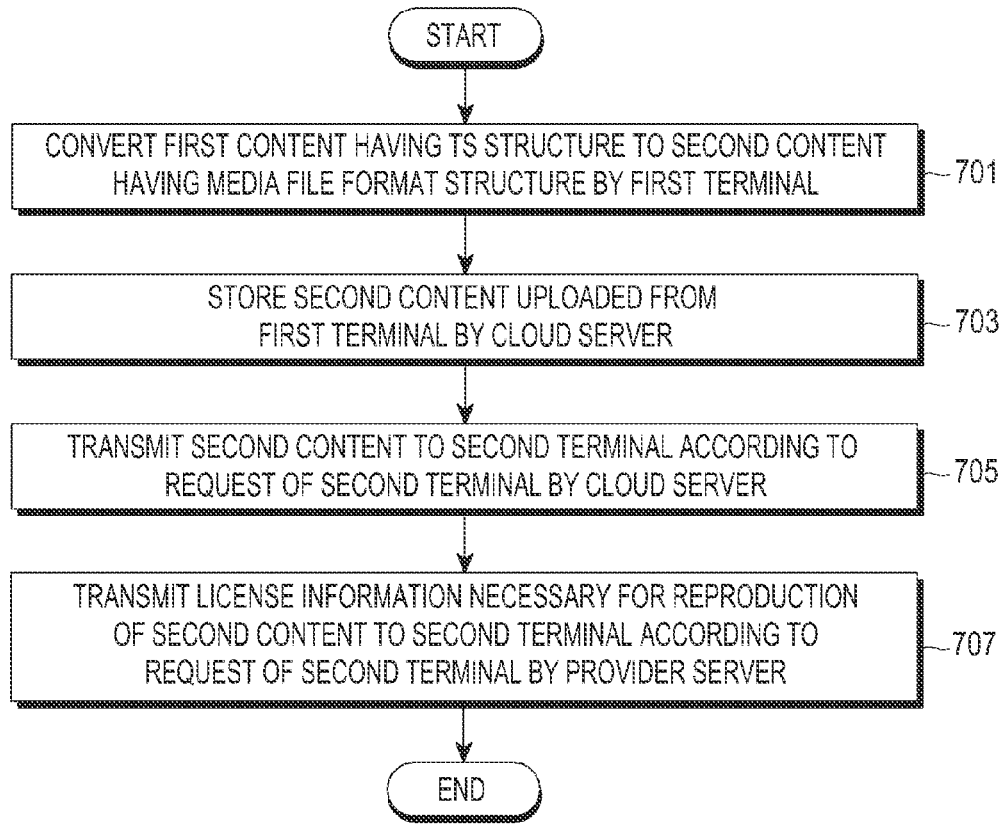
FIG. 7 is a flowchart illustrating a method of converting and sharing content according to Scenario 1 in a multimedia system according to an embodiment of the present disclosure.

FIG. 7 is a flowchart illustrating a method of converting and sharing content according to Scenario 1 in a multimedia system according to an embodiment of the present disclosure. The method of FIG. 7 will be described with reference to FIG. 6.

Referring to FIG. 7, in operation 701, the first terminal 650a converts a first content having an MPEG based TS structure to a second content based on an ISO base media file format. Then, it is assumed that a client program for conversion of content is installed in the first terminal 650a. The client program performs an operation of converting the first content to the second content according to the methods described in the embodiments of FIGS. 1 to 5. The reference information used during the conversion of the content may be included in the first content or may be provided through the provider server 610. If the reference information is separately provided through the provider server 610, the client program is implemented to provide a user interface for downloading the reference information through the first terminal 650a.

If the content is completely converted, the first terminal 650a uploads the second content to the cloud server 630 and the cloud server 630 stores the uploaded second content in operation 703. Then, the second content may be stored to correspond to identification information of a first user of the first terminal 650a. For example, one or a plurality of other users to which a content sharing relationship with the first user is set accesses to the cloud server 630 to inquire and download the one or the plurality of content uploaded by the first user. Accordingly, if a content sharing relationship with the first user is set to the second user, the cloud server 630 transmits the second content to the second terminal 650b according to a request of the second terminal 650b of the second user who inquired the second content in operation 705.

Meanwhile, when the second content is encrypted, the provider server 610 transmits license information to the second terminal 650b according to a request of the second terminal in operation 707. Here, the license information includes an encryption key necessary for reproduction of the second content. The second terminal 650b acquires an encryption key from the license information, and decrypts and reproduces the second content using the encryption key. Operation 707 may be selectively performed according to whether the second content has been encrypted.

Figure 8:
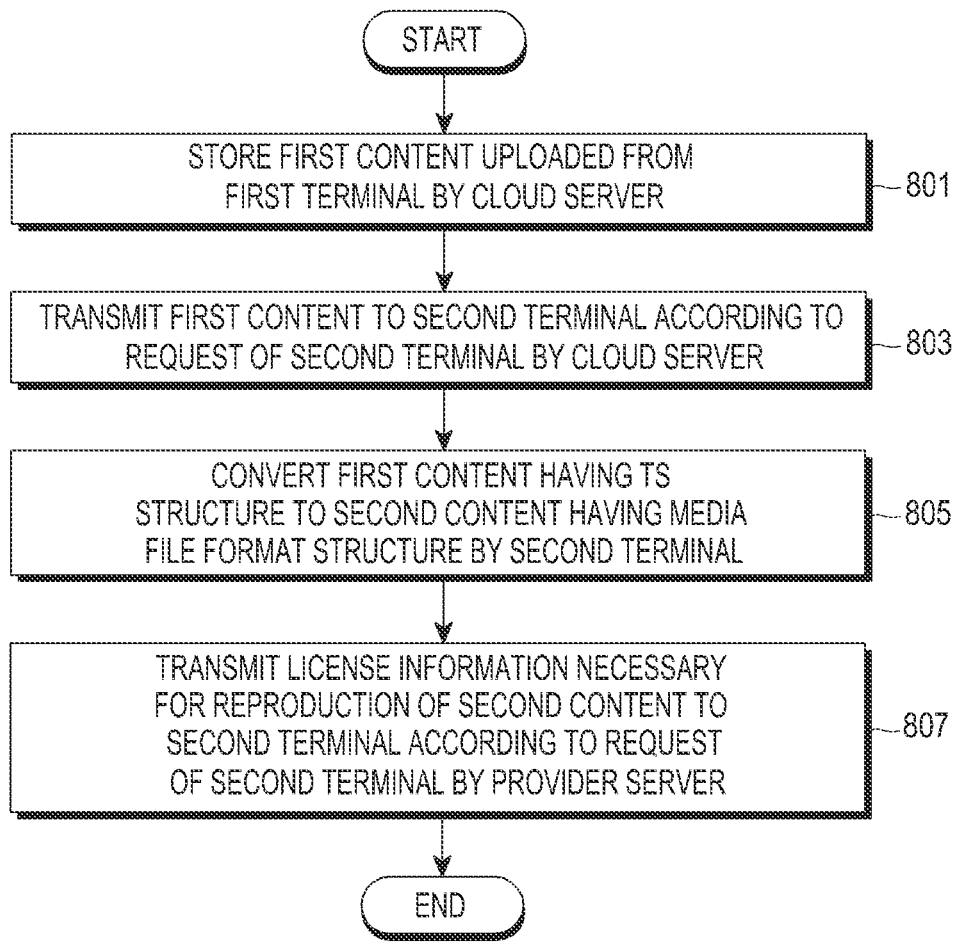
FIG. 8 is a flowchart illustrating a method of converting and sharing content according to Scenario 2 in a multimedia system according to an embodiment of the present disclosure.

FIG. 8 is a flowchart illustrating a method of converting and sharing content according to Scenario 2 in a multimedia system according to an embodiment of the present disclosure. The method of FIG. 8 will be described with reference to FIG. 6.

Referring to FIG. 8, the first terminal 650a uploads a first content having an MPEG based TS structure to the cloud server 630 and the cloud server 630 stores the uploaded second content in operation 801. Then, the first content may be stored to correspond to identification information of a first user of the first terminal 650a. The storage method may be the same method as the method described in the embodiment of FIG. 7. If a content sharing relationship with the first user is set to the second user, the cloud server 630 transmits the first content to the second terminal 650b according to a request of the second terminal 650b of the second user who inquired the first content in operation 803.

Thereafter, the second terminal 650b converts the first content to ISO base media file format based second content in operation 805. Then, it is assumed that a client program for conversion of content is installed in the second terminal 650b. The function of the client program is the same as the function described in the embodiment of FIG. 7. Meanwhile, when the second content is encrypted, the provider server 610 transmits license information to the second terminal 650b according to a request of the second terminal 650b in operation 807. Here, the license information includes an encryption key necessary for reproduction of the second content. The second terminal 650b acquires an encryption key from the license information, and decrypts and reproduces the second content using the encryption key. Operation 807 may be selectively performed according to whether the second content has been encrypted.

Figure 9:
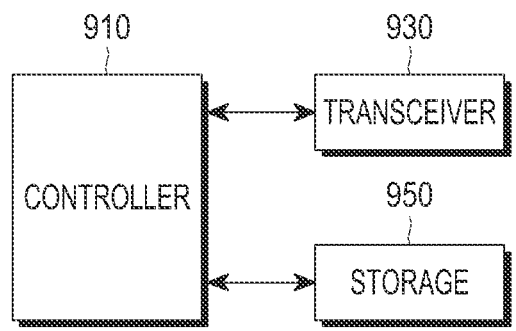
FIG. 9 is a block diagram illustrating a configuration of a provider server in a multimedia system according to an embodiment of the present disclosure.

FIG. 9 is a block diagram illustrating a configuration of a provider server in a multimedia system according to an embodiment of the present disclosure.

The provider server 610 of FIG. 9 includes a controller 910 for controlling an overall operation of the server, a transceiver 930 for data communications, and a storage 950 for storing data. The controller 910 controls an operation of transmitting the license information including the encryption key for reproduction of content to a terminal when a request is made by a terminal according to the embodiment of FIGS. 7 and 8. The controller 910 controls an operation of transmitting a client program for conversion and sharing of the content to the terminal when a request is made by the terminal.

Figure 10:
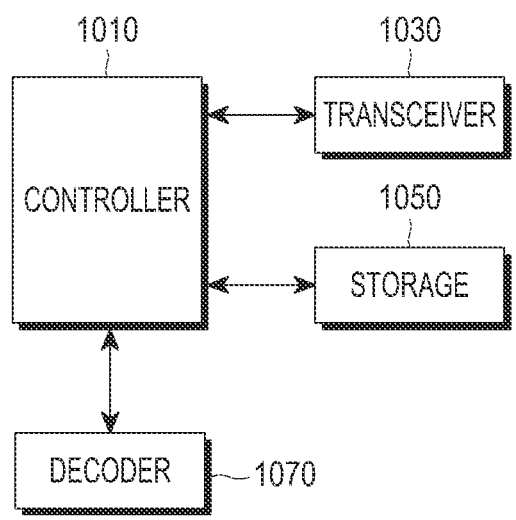
FIG. 10 is a block diagram illustrating a configuration of a terminal in a multimedia system according to an embodiment of the present disclosure.

FIG. 10 is a block diagram illustrating a configuration of a terminal in a multimedia system according to an embodiment of the present disclosure.

The terminal of FIG. 10 may be a terminal (e.g., various wired or wireless devices, such as a reproduction device, a display device, a portable terminal, and a computer device, which may reproduce content) for converting a first content to a second content according to the method described in the embodiments of FIGS. 1 to 8.

The terminal of FIG. 10 includes a controller 1010, a transceiver 1030, a storage 1050, and a decoder 1070. The controller 1010 controls a general operation of reproducing and recording video data and audio data. In addition, the controller 1010 controls an operation of converting a first content having an MPEG based TS structure to a second content based on an ISO base media file format and uploading or downloading content such that the content may be shared through the cloud server 630 according to the methods described in FIGS. 1 to 7 using the client program. The transceiver 1030 is adapted to transmit and receive data through a wired/wireless communication network, and the storage 1050 is adapted to store content. The client program may be stored in the storage 1050 to be used by the controller 1010 or may be included in the controller 1010. The decoder 1070 is adapted to decode content. Although not illustrated, the terminal of FIG. 10 may include a display and a speaker which display multimedia data including video data and audio data to the user under the control of the controller 1010.

Although embodiments of the present disclosure have been individually described above, two or more of the embodiments may be implemented in combination.

The above described embodiments of the present disclosure may also be implemented as a computer readable code in a computer readable recording medium. The computer readable recording medium any type of data storage device that may store data readable by a computer system. Examples of record-mediums readable by the computer may include a Read-Only Memory (ROM), a Random-Access Memory (RAM), a Compact Disc-Read Only Memory (CD-ROM), magnetic tapes, floppy disks, optical data storage devices, carrier waves (such as data transmission through the Internet). Further, functional programs, codes and code segments for achieving the present disclosure may be easily interpreted by programmers skilled in the art which the present disclosure pertains to.

It will be appreciated that an apparatus and a device according to embodiments of the present disclosure may be implemented in a form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It may be also appreciated that the memory included in the mobile terminal is one example of machine-readable devices suitable for storing a program including instructions that are executed by a processor device to thereby implement embodiments of the present disclosure.

Accordingly, the present disclosure includes a program for a code implementing the apparatus and method described in the appended claims of the specification and a machine (a computer or the like)-readable storage medium for storing the program.

While the present disclosure has been illustrated and described with reference to various embodiments thereof, it will be understood by those skilled in the art that various changes in form and details may be made therein without departing from the spirit and scope of the present disclosure as defined by the appended claims and their equivalents.

What is claimed is:

1. A method of converting content by a terminal, the method comprising:
obtaining reference information for converting a first content to a second content, the first content being based on a transport stream for the content, the second content being based on a media file format for the content; and
converting, by the terminal, the first content to the second content using the reference information,
wherein the reference information includes a fragment indicator distinguishing a movie fragment of the media file format,
wherein the transport stream includes at least one of video elementary streams and audio elementary streams, and
wherein the media file format includes a media data field including media data and a media header field including metadata.

2. The method of claim 1, wherein the transport stream is a moving picture experts group (MPEG) transport stream and the media file format is an international organization for standardization (ISO) base media file format.

3. The method of claim 1, wherein the fragment indicator is inserted for one of a predetermined position of a packet.

4. The method of claim 1, wherein the reference information further comprises at least one piece of parameter information defining the fragment indicator.

5. The method of claim 4, wherein the at least one piece of parameter information includes a time offset representing a duration between a current fragment indicator and a following fragment indicator.

6. The method of claim 4, wherein the at least one piece of parameter information includes information representing the number of element streams existing in a section indicated by the fragment indicator.

7. The method of claim 4, wherein the at least one piece of parameter information includes information representing the number of samples existing in a section indicated by the fragment indicator.

8. The method of claim 1, wherein the converting of the first content to the second content is performed by using a program provided through a provider server which provides the content.

* * * * *